United States Patent [19]

Hayashi et al.

[11] Patent Number: 4,532,291

[45] Date of Patent: Jul. 30, 1985

[54] BEAD FILLER RUBBER COMPOSITION

[75] Inventors: Junnosuke Hayashi; Teruo Tanibuchi, both of Ichihara; Shinji Yamamoto, Yotsukaido, all of Japan

[73] Assignee: UBE Industries, Ltd., Ube, Japan

[21] Appl. No.: 606,971

[22] Filed: May 4, 1984

[30] Foreign Application Priority Data

May 6, 1983 [JP] Japan .................................. 58-78307

[51] Int. Cl.[3] .................................................. C08K 3/04

[52] U.S. Cl. .................................... 524/496; 524/504; 525/63

[58] Field of Search ................... 524/496, 504; 525/63

[56] References Cited

U.S. PATENT DOCUMENTS 4,251,409 2/1981 Neubert ............................... 524/504

4,355,131 10/1982 Wise .................................... 524/501

OTHER PUBLICATIONS

Derwent Abstract 06652 D/05, (J55151053), Nov. 1980, Bridgestone.

*Primary Examiner*—Herbert J. Lilling

*Attorney, Agent, or Firm*—Finnegan, Henderson, Farabow, Garrett, & Dunner

[57] ABSTRACT

A bead filler rubber composition, comprising:

(A) a resin forced rubber composition comprising vulcanizable rubber including 5 to 100 parts by weight, based on 100 parts by weight of the rubber, of fine short fibers of thermoplastic polymer having $$-\overset{\overset{\displaystyle O}{\|}}{C}NH-$$

groups buried therein, and the vulcanizable rubber and the thermoplastic polymer being grafted to each other through a phenol formaldehyde resin precondensate at an interface of the fiber;

(B) a diene rubber; and (C) carbon black, wherein the following conditions (i) through (iv) are satisfied:

(i) the amount of said thermoplastic polymer is 2 to 20 parts by weight based on 100 parts by weight of the total amount of the rubber constituents;

(ii) the ratio of the rubber is such that the total amount of the natural rubber or polyisoprene in the component (A) and the component (B) is 100 to 55% by weight;

(iii) the amount of the carbon black is 50 to 70 parts by weight on 100 parts by weight of the total amount of the rubber constituents; and (iv) the vulcanizate derived from the rubber composition has a 50% modulus of at least 30 kg/cm$^2$.

4 Claims, No Drawings

BEAD FILLER RUBBER COMPOSITION

BACKGROUND OF THE INVENTION

1. Field of the Invention

The present invention relates to a bead filler rubber composition. More specifically, it relates to a bead filler rubber composition having a low Mooney viscosity (ML) and an excellent workability, and capable of providing a vulcanizate having an excellent flex cracking propagation resistance.

2. Description of the Prior Art

With the recent development of high-speed highways, etc., tires are required to have more durability to high speeds. It is well known that as the running speed of a tire becomes higher, a standing wave phenomenon tends to occur, which in its turn leads to the destruction of the tire. Enhancing the rigidity of the bead portion of the tire is considered to be an effective means of suppressing the standing wave phenomenon. Furthermore, increasing the modulus of elasticity of the bead portion is effective for reducing the rolling resistance of the tire. For these reasons, rubber having a high modulus of elasticity is desirable as a bead filler rubber.

On the other hand, if the standing wave phenomenon occurs, the bead portion undergoes remarkable deformation. Therefore, from the viewpoint of safety, the cracking propagation resistance of the bead filler rubber should be high enough to prevent easy destruction of the tire. That is, in order to improve the durability at high speed of the tire, the bead filler rubber should satisfy the following requirements; a high modulus of elasticity and an excellent cracking propagation resistance.

Various methods have been heretofore attempted to obtain a rubber having a high modulus of elasticity. A method comprising compounding a large amount of carbon black is undesirable because the knitting performance of rubber during working procedures is poor, an increase electric power load is experienced during mixing in a Banbury mixer, and the resultant compound exhibits a high ML which results in difficulties in molding a tire from the compound. A method comprising compounding a large amount of sulfur is disadvantageous in that blooming of the sulfur occurs and the physical properties, such as flex cracking propagation resistance, of the resultant rubber are remarkably deteriorated due to the increased crosslinking density thereof. Another method of providing rubber having a high modulus of elasticity is to add a thermoplastic resin. However, because the thermosetting resin has a poor compatibility with natural rubber or a diene rubber, when the thermosetting resin is compounded in a large amount, the production conditions are subjected to severe limitations, for example, an extended period of mixing is needed to attain a satisfactory dispersion state. In addition, because rolling stock containing a large amount of a thermosetting resin compounded thereinto is hard even in its unvulcanized state, a large load may be required in mixing and extruding the stock or the molding workability may become inferior. A method comprising merely compounding short fibers is disadvantageous in that, because of unsatisfactory bonding between the short fiber and the rubber, the resultant vulcanizate exhibits a low creep resistance and a reduced fatigue life.

SUMMARY OF THE INVENTION

Accordingly, the object of the present invention is to provide a bead filler rubber composition having a low Mooney viscosity and capable of providing a vulcanizate having a high modulus of elasticity and an excellent flex cracking propagation resistance.

Other objects and advantages of the present invention will be apparent from the following description.

In accordance with the present invention, there is provided a bead filler rubber composition comprising:

(A) a reinforced rubber composition comprising vulcanizable rubber including 5 to 100 parts by weight, based on 100 parts by weight of the rubber, of fine short fibers of thermoplastic polymer having $$-\overset{O}{\overset{\|}{C}}NH-$$

groups buried therein, the vulcanizable rubber and the thermoplastic polymer being grafted to each other through a phenol formaldehyde resin precondensate at an interface of the fiber;

(B) a diene rubber; and (C) carbon black, wherein the following conditions (i) through (iv) are satisfied:

(i) the amount of thermoplastic polymer is 2 to 20 parts by weight based on 100 parts by weight of the total amount of the rubber constituents;

(ii) the ratio of the rubber is such that the total amount of the natural rubber or polyisoprene in the component (A) and the component (B) is 100 to 55% by weight;

(iii) the amount of the carbon black is 50 to 70 parts by weight based on 100 parts by weight of the total amount of the rubber constituents; and (iv) the vulcanizate derived from the rubber composition has a 50% modulus of at least 30 kg/cm$^2$.

DESCRIPTION OF THE PREFERRED EMBODIMENTS

The bead filler rubber composition of the present invention has a low Mooney viscosity $ML_{1+4}$ (100° C.) (hereinafter abbreviated as ML) and an excellent workability, and is capable of providing a vulcanizate having a 50% modulus (hereinafter abbreviated as $M_{50}$) of at least 30 kg/cm$^2$, a number of flexings of at least 1000 as determined by a flex cracking propagation resistance test, a high modulus of elasticity, and an excellent cracking propagation resistance.

It is essential in the present invention to incorporate into the rubber composition a reinforced rubber composition comprising vulcanizable rubber including fine short fibers of thermoplastic polymer having $$-\overset{O}{\overset{\|}{C}}NH-$$

groups buried therein, wherein the vulcanizable rubber and the thermoplastic polymer are grafted to each other through a phenol formaldehyde resin precondensate at an interface of the fiber; and the ratio of the fiber to the vulcanizable rubber is 5 to 100 parts by weight, preferably 20 to 100 parts by weight, based on 100 parts by weight of the rubber. This incorporation of the reinforced rubber composition makes it possible to obtain a rubber composition having excellent moldability and processability in spite of the incorporation of the polymer fiber.

Examples of the vulcanizable rubber are natural rubber, cis-1,4-polybutadiene, polyisoprene, styrenebutadiene copolymer rubber, isoprene-isobutyrene copolymers, and the like. Of these rubbers, natural rubber is preferable.

The fine short fiber of thermoplastic polymer is made of a thermoplastic polymer having $$-\overset{O}{\overset{\|}{C}}NH-$$

groups in the molecule thereof and a melting point of 190° C. to 235° C., preferably 190° C. to 225° C., more preferably 200° C. to 220° C., such as nylon, for example, nylon 6, nylon 610, nylon 12, nylon 611 and nylon 612, polyureas, for example, polyheptamethylene urea and polyundecamethylene urea, and polyurethanes. The fine short fiber is preferably made of nylon. The fine short fibers have a circular cross-section having an average diameter of 0.05 to 0.8 μm. The shortest length of the fine short fibers is preferably 1 μm or more. The molecules of the thermoplastic resin are preferably oriented in the direction of the fiber axis. These fine short fibers are buried in the vulcanizable rubber.

The thermoplastic polymer having $$-\overset{O}{\overset{\|}{C}}NH-$$

groups in the molecule thereof and the vulcanizable rubber are grafted to each other through a phenol formaldehyde resin precondensate at an interface of the fiber.

Examples of the phenol formaldehyde precondensate are a resol type phenol formaldehyde resin precondensate and a novolak type phenol formaldehyde resin precondensate. Of these precondensates, the novolak type phenol formaldehyde resin precondensate (hereinafter abbreviated as novolak) is preferable.

The novolaks usable in the present invention are soluble and meltable resins and their modified products, obtained from condensation reactions of phenols such as phenol or bisphenol with formaldehyde (or paraformaldehyde) in the presence of an acidic catalyst known per se, such a sulfuric acid, hydrochloric acid, phosphoric acid, or oxalic acid. Examples of the novolaks desirably usable in the present invention are novolak type phenol formaldehyde resin precondensates, novolak type lactam-bisphenol F-formaldehyde resin precondensates, and novolak type styrenated phenol-phenol formaldehyde resin precondensates.

According to the present invention, since the strength of the fine short fibers of the thermoplastic polymer having $$-\overset{O}{\overset{\|}{C}}NH-$$

groups buried in the vulcanizable rubber in the reinforced rubber composition used is strong, and since the thermoplastic polymer and the vulcanizable rubber are grafted to each other through, preferably, the novolak at an interface of the short fiber, a rubber composition having a high modulus of elasticity, a large number of flexings as determined by the flex cracking propagation resistance test, and a low ML can be obtained.

According to the present invention, there is used a reinforced rubber composition in which the ratio of the fine short fibers of the thermoplastic polymer having $$-\overset{O}{\overset{\|}{C}}NH-$$

groups buried in the vulcanizable rubber and grafted thereto to the vulcanizable rubber is 5 to 100 parts by weight based on 100 parts by weight of the rubber. Particularly, in the present invention, the thermoplastic polymer forming the fiber and the vulcanizable rubber are preferably grafted to each other through, preferably, the novolak in a graft ratio of 3 to 25% by weight, preferably 5 to 20% by weight, the graft ratio being defined as the ratio of the weight of the vulcanizable rubber grafted to the thermoplastic polymer through the novolak at an interface of the fiber to the weight of the fine short fibers of the thermoplastic polymer buried in the vulcanizable rubber (the vulcanizable rubber/the fine short fibers of the thermoplastic polymer).

The reinforced rubber composition of the present invention having the above-mentioned features can be prepared in the following manner. For example, the vulcanizable rubber, the thermoplastic polymer having $$-\overset{O}{\overset{\|}{C}}NH-$$

groups in the polymer molecule and having a molecular weight of less than 200000, 0.2 to 5 parts by weight, based on 100 parts by weight of the total amount of the rubber and the thermoplastic polymer, of the novolak type phenol formaldehyde resin precondensate, and a formaldehyde producing compound are mixed together at a temperature of not less than the melting point of the thermoplastic polymer, but not more than 270° C. When the ratio of the rubber and the thermoplastic polymer in the resultant mixture is 5 to 100 parts by weight of the thermoplastic polymer, based on 100 parts by weight of the rubber, the mixture is directly subjected to extrusion. When the ratio of the rubber and the thermoplastic polymer in the mixture is more than 5 parts by weight of the thermoplastic polymer, based on 100 parts by weight of the rubber, if necessary, the vulcanizable rubber is additionally added to the mixture in an amount such that the amount of the thermoplastic polymer is 5 to 100 parts by weight based on 100 parts by weight of the total amount of the vulcanizable rubber, and the resultant mixture is mixed at a temperature of not less than the melting point of the thermoplastic polymer but not more than 270° C., after which it is subjected to extrusion. The extrusion procedure is carried out at a temperature of not less than the melting point of the thermoplastic polymer but not more than 270° C. Then, the extrudate is drawn at a temperature of less than the melting point of the thermoplastic polymer.

As the formaldehyde producing compound, there are used those capable of producing formaldehyde upon heating. Examples of the formaldehyde producing compounds are hexamethylene tetramine, acetaldehyde ammonia

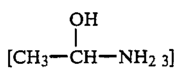

paraformaldehyde, 2-polyoxymethylene, polyhydric methylol melamine derivatives, oxazolidine derivatives, and polyhydric methylol acetylene urea.

When the vulcanizable rubber, the thermoplastic polymer having $$-\overset{\overset{\displaystyle O}{\|}}{C}NH-$$

groups in the polymer molecule, the novolak, and the formaldehyde producing substance are mixed in the above-mentioned manner, the vulcanizable rubber and the thermoplastic polymer are grafted to each other through the novolak, and the thermoplastic polymer is uniformly and finely dispersed in the vulcanizable rubber. The particle size of the dispersed thermoplastic polymer is generally 1 to 2 μm.

In the above-mentioned method, the molecules of the fibrous thermoplastic polymer dispersed in the vulcanizable rubber of the resultant reinforced rubber composition are highly oriented parallel to the fiber axis direction by drawing the extrudate. Thus, fine short fibers of the thermoplastic polymer having a high strength are formed in the resultant reinforced rubber composition.

The reinforced rubber composition obtained by the above-mentioned method is such that it contains 5 to 100 parts by weight of the thermoplastic polymer having $$-\overset{\overset{\displaystyle O}{\|}}{C}NH-$$

groups in the form of fine short fibers, based on 100 parts by weight of the vulcanizable rubber, and the thermoplastic polymer and the vulcanizable rubber are grafted to each other through the novolak at an interface of the fiber.

The bead filler rubber composition according to the present invention comprises (A) the above-mentioned reinforced rubber composition, (B) a diene rubber, and (C) carbon black.

Examples of the diene rubber (B) are natural rubber, polyisoprene, cis-1,4-polybutadiene styrenebutadiene copolymer rubber, isoprene-isobutylene copolymers and the like. These diene rubbers may be used alone or in any mixture thereof.

Desirable carbon blacks usable in the present invention are those having a particle diameter of 90 mμ or less, preferably 20 to 90 mμ, and a dibutyl phthalate (DBP) oil absorption of 70 ml/100 g or more, preferably 70 to 200 ml/100 g. As the carbon black, there are used various carbon blacks such as FEF, FF, GPF, SAF, ISAF, SRF, and HAF.

The above-mentioned constituents are compounded in amounts such as to satisfy the following conditions:

(i) The amount of the thermoplastic polymer (fine short fiber) is 2 to 20 parts by weight, desirably 2 to 15 parts by weight, based on 100 parts by weight of the total amount of the rubber constituents.

(ii) The ratio of the rubber is such that the total amount of the natural rubber or polyisoprene in the component (A) and the component (B) is 100 to 55% by weight.

(iii) The amount of the carbon black is 50 to 70 parts by weight based on 100 parts by weight of the total amount of the rubber constituents.

(iv) The vulcanizate derived from the composition has a 50% modulus of at least 30 $kg/cm^2$.

When the amount of the thermoplastic polymer is less than the above-mentioned lower limit, the resultant rubber composition cannot provide a vulcanizate having a high modulus of elasticity and a large number of flexings. When the amount of the thermoplastic polymer is more than the above-mentioned upper limit, the resultant rubber composition which leads to an inferior flex cracking propagation resistance of the vulcanizate derived therefrom. When the compounding ratio of the natural rubber on the polyisoprene is outside the above-mentioned range, the resultant vulcanizate is liable to exhibit a small number of flexings, as determined by the flex cracking propagation resistance test. When the amount of the carbon black is less than the above-mentioned lower limit, the resultant vulcanizate has a low modulus of elasticity, while when the amount of the carbon black is more than the above-mentioned upper limit, the resultant rubber composition has a high ML. Also, when the $M_{50}$ of the vulcanizate is outside the above-mentioned range, such a rubber composition is not suitable as the bead filler rubber composition.

The bead filler rubber composition of the present invention can be obtained by mixing the above-mentioned constituents at a temperature of 50° C. to 180° C. for approximately 1 to 60 minutes by using a mixing device such as a Banbury mixer or a roll mill.

The bead filler rubber composition of the present invention may contain additives such as vulcanizing agents.

Examples of the vulcanizing agent are any conventional vulcanizing agents, for example, sulfur, organic peroxides, and sulfur-containing compounds. The method of the compounding of the vulcanizing agent into the rubber composition is not specifically limited. Any compounding method known per se can be used. The rubber composition may contain, in addition to the vulcanizing agent, reinforcing agents such as thermosetting resin, white carbon, activated calcium carbonate, ultrafinely powdered magnesium silicate, high styrene resin, cumarone-indene resin, phenol resin, lignin, modified melamine resin, and petroleum resin; filler such as various grades of calcium carbonate, basic magnesium carbonate, clay, zinc oxide, diatomaceous earth, reclaimed rubber, powdered rubber, and ebonite powder; vulcanization accelerators such as aldehyde, ammonias, aldehydeamines, guanidines, thioureas, thiazoles, thiurams, dithiocarbamates, and xanthates; vulcanization acceleration aids such as metal oxides and fatty acids; sulfur- or phosphorus-containing antioxidants and naphthenic or aromatic process oils. These additives are compounded in amounts such as will not damage the effects of the present invention.

Especially, it is desirable that the rubber composition of the present invention contains a thermosetting resin, such as a novolak type phenol resin, in an amount of 1 to 30 parts by weight based on 100 parts by weight of the total amount of the rubber constituents.

The rubber composition of the present invention has a low Mooney viscosity and thus an excellent workability, and the vulcanizate derived from the rubber composition has an $M_{50}$ of at least 30 kg/cm², a number of flexings of at least 1000, and thus a high modulus of elasticity and an excellent flex cracking propagation resistance. The vulcanizate is also characterized by the hardness thereof, which is 80 to 150, preferably 80 to 100, determined according to a JIS K 6301 method. Therefore, the rubber composition of the present invention can be used as tire members for automobiles, buses, trucks, airplanes and the like together with other tire members such as sidewall, tread, chafer, rim and bead, in place of conventional bead filler rubber compositions.

Examples and comparative examples are given hereunder. In the following description, all parts are expressed on a weight basis.

The Mooney viscosity $ML_{1+4}$(100° C.) of the unvulcanized rubber composition was determined according to a JIS K 6300 method. The physical properties (tensile modulus of elasticity, tensile strength, number of flexings, hardness) were determined according to JIS K 6301 methods.

EXAMPLE 1

100 parts of natural rubber (NR) having a viscosity of $1\times10^6$ poise and 1.0 part of N-(3-methacryloyloxy-2-hydroxypropyl)-N'-phenyl-p-phenylene-diamine (Knocklack G-1, manufactured by Ouchi Shinko Kagakukogyo Co., Ltd) were charged into a Banbury mixer and were masticated at a temperature of 150° C. at a revolution number of 150 rpm for one minute. Then, 50 parts of 6-nylon (trade name: 1030B, manufactured by Ube Kosan Co., Ltd., melting point 221° C., molecular weight 30000) was charged and was mixed for 4 minutes. During mixing, the temperature in the mixer was raised to 230° C. and the 6-nylon was melted.

Next, 2.25 parts of a novolak type phenol formaldehyde precondensate (trade name 550 PL, manufactured by Meiwa Kasei Co., Ltd.) in the form of powdered crystals, which was obtained from the condensation of phenol with paraformaldehyde in the presence of a catalyst consisting of oxalic acid and had a softening point of 106° C., a water content of 0.12% by weight and a free phenol content of 0.13% by weight, was charged and was mixed for 7 minutes. Thereafter, 0.225 part of hexamethylenetetramine was charged and was mixed for 2.5 minutes (during this mixing, the temperature in the Banbury mixer was 230° C.) to effect a graft reaction, after which the mixture was dumped from the mixer.

The resultant mixture was extruded at a die temperature of 235° C. into a strand by using a 20 mmϕ extruder provided with a circular die having an inner nozzle diameter of 2 mm and a ratio (L/D) of a length L to an inner diameter D of 2 (manufactured by Hoake Co.). The strand was wound on a bobbin through a funnel located at a position perpendicularly downward from the nozzle and guide rolls at a draft ratio of 9 at a winding rate of 35 m/min. The funnel was assembled such that a cooling water having a temperature of 0° C. was circulated through the funnel to a cooling water reservoir located at a position perpendicularly downward from the funnel by means of a pump and a piping system. The wound strand was vacuum dried at a room temperature for one day to remove the attached water therefrom. 500 pieces of the strands were bundled into a sheet-like material having a thickness of 2 mm and a width of 150 mm. The sheet-like material was rolled by using a pair of pressure rolls having a temperature of 60° C. and a roll nip of 0.2 mm at a rolling ratio of about 10 to obtain a reinforced rubber composition (master batch) (sample 1).

The formulation, shown in Table 2, excluding a vulcanization accelerator and sulfur was mixed in a Banbury mixer at a temperature of 90° C. at a revolution number of 77 rpm to obtain a mixture which is a bead filler rubber composition. Then, the mixture was mixed with the vulcanization accelerator and sulfur on 10 inch rolls and was discharged therefrom as a sheet-like material. The sheet-like material was then vulcanized in a mold at a temperature of 145° C. for 40 minutes to obtain a vulcanizate. The results are summarized in Tables 1 and 2.

SEPARATION AND DETERMINATION OF GRAFT RATIO

Two grams of the reinforced rubber composition obtained in Example 1 was added to 200 ml of benzene at a room temperature and the rubber content in the composition was dissolved in the benzene. The slurry thus obtained was centrifugally separated into a solution portion and a precipitation portion. The precipitation portion was repeatedly subjected to the above-mentioned procedure seven times. Thereafter, the final precipitation portion was dried to obtain nylon fiber. The nylon fiber thus obtained was dissolved in a mixed solvent of phenol and orthodichlorobenzene (a weight ratio of 1:3) and was analyzed according to an $^1$H nuclear magnetic resonance (NMR) spectrum analysis by using as an internal standard tetramethylsilane. From the NMR chart, a mol ratio of 6-nylon and natural rubber was determined by a measurement of the area of the signals of the methyl and methylene groups derived from natural rubber, the methylene group adjacent to the CO group, the methylene group adjacent to the NH group and the other three methylene groups, derived from 6-nylon. Thus, the graft ratio was calculated.

The shape of the nylon fiber was determined by observing about 200 nylon fibers under a scanning electron microscope at a magnification time of 10000. The fiber was extremely fine short fiber having a circular cross-section.

The results are shown in Table 1.

EXAMPLE 2

A reinforced rubber composition (sample 2) was prepared in the same manner as in Example 1, except that a novolak type lactam-bisphenol F-formaldehyde resin precondensate was used as the novolak. The lactam-bisphenol F-formaldehyde resin precondensate was prepared as follows:

One hundred and forty one parts of ϵ-caprolactam and 55.6 parts of paraformaldehyde having a purity of 81% were allowed to react at a temperature of 120° C. for 5 hours to obtain an addition reaction solution containing the addition reaction product of ϵ-caprolactam and formaldehyde. The total amount of the addition reaction solution was gradually and dropwise added to a mixture of 315 parts of bisphenol F, 32 parts of water, and 1.6 parts of 35% hydrochloric acid, and the addition product of ϵ-caprolactam and formaldehyde and bisphenol F were subjected to a condensation reaction. Then, the reaction mixture was distilled at a temperature of 180° C. under a reduced pressure (10 mmHg). Thus, the desired novolak type lactam-bisphenol F-formaldehyde precondensate was obtained.

Then, a bead filler rubber composition was prepared in the same manner as in Example 1, except that the reinforced rubber composition obtained above was used.

The results are summarized in Tables 1 and 2.

EXAMPLE 3

A reinforced rubber composition (sample 3) was prepared in the same manner as in Example 1, except that a novolak type styrenated phenol-phenol-formaldehyde resin precondensate was used as the novolak. The used precondensate was prepared as follows:

One thousand and forty one parts of styrene was gradually and dropwise added to a mixture of 1412 parts of phenol and 40.3 parts of 35% hydrochloric acid and then the mixture was mixed at a temperature of 130° C. for 2 hours to obtain styrenated phenol. The styrenated phenol was recovered from the reaction mixture by a vacuum distillation under the conditions of 180° C. and 40 mmHg. To the total amount of the styrenated phenol thus obtained, 1426 parts of formalin and 37 parts of a 40% aqueous sodium hydroxide solution were added and the mixture was mixed at a temperature of 80° C. for 5 hours to effect addition of the formaldehyde to the styrenated phenol (i.e., the methylol styrenated phenol was formed). To the total amount of the addition product thus obtained, 1653 parts of phenol and 123 parts of oxalic acid were added. Thus, a condensation reaction of the methylol styrenated phenol and phenol was effected at a temperature of 100° C. for 2 hours. The desired styrenated phenol-phenol-formaldehyde resin precondensate having a softening point (according to a ring and ball method) of 73° C. was recovered from the reaction mixture by a vacuum distillation method under the conditions of 100° C. to 180° C. and 40 mmHg.

Then, a bead filler rubber composition was prepared in the same manner as in Example 1, except that the reinforced rubber composition obtained above was used.

The results are summarized in Tables 1 and 2.

EXAMPLE 4

A reinforced rubber composition (sample 4) was prepared in the same manner in Example 1, except that the amount of the 6-nylon charged to the natural rubber was changed to 100 parts.

A bead filler rubber composition having the formulation shown in Table 2 was prepared by using the reinforced rubber composition obtained above.

The results are summarized in Tables 1 and 2.

EXAMPLE 5

A reinforced rubber composition (sample 5) was prepared in the same manner as in Example 1, except that the amount of the 6-nylon charged to the natural rubber was changed to 20 parts.

A bead filler rubber composition having the formulation shown in Table 2 was prepared by using the reinforced rubber composition obtained above.

The results are summarized in Tables 1 and 2.

EXAMPLES 6 THROUGH 10

Bead filler rubber compositions were prepared in the same manner as in Example 1, except that the compounding ratios of the components were changed as shown in Table 2.

The results are summarized in Table 2.

EXAMPLES 11 THROUGH 13

Example 1 was repeated, except that the type of the carbon black to be compounded was changed.

The results are summarized in Table 2.

COMPARATIVE EXAMPLES 1 AND 2

A bead filler rubber composition was prepared in the same manner as in Example 1, except that the reinforced rubber composition was not used and the ratio of the components was changed as shown in Table 2.

The results are summarized in Table 2.

TABLE 1

| Reinforced rubber composition | Sample 1 | Sample 2 | Sample 3 | Sample 4 | Sample 5 |
|---|---|---|---|---|---|
| Average diameter of fiber (μm) | 0.1 | 0.1 | 0.1 | 0.1 | 0.1 |
| Shortest length of fiber (μm) | ≧10 | ≧10 | ≧10 | ≧10 | ≧10 |
| Graft ratio (% by weight) | 15 | 13 | 14 | 13 | 16 |

The length of the nylon fibers buried in each reinforced rubber composition of samples 1 through 5 is about 200 μm or less (calculated).

TABLE 2

| | | Example 1 | Example 2 | Example 3 | Example 4 | Example 5 |
|---|---|---|---|---|---|---|
| Formation (Note 5) | | | | | | |
| Reinforced rubber composition | Type | Sample 1 | Sample 2 | Sample 3 | Sample 4 | Sample 5 |
| | Amount (part) | 15 | 15 | 15 | 10 | 30 |
| NR | Amount (part) | 90 | 90 | 90 | 95 | 75 |
| BR (Note 1) | Amount (part) | — | — | — | — | — |
| SBR (Note 2) | Amount (part) | — | — | — | — | — |
| Carbon black (Note 3) | Type | N-330 | N-330 | N-330 | N-330 | N-330 |
| | Amount (part) | 50 | 50 | 50 | 50 | 50 |
| Thermosetting resin | Amount (part) | — | — | — | — | — |
| Hexamethylenetetramine | Amount (part) | — | — | — | — | — |
| Ratio of nylon to total rubber content (PHR) | | 5 | 5 | 5 | 5 | 5 |
| Bead filler rubber composition $ML_{1+4}$ (100° C.) | | 60 | 59 | 60 | 59 | 57 |
| Valcanizate | $M_{50}$ (kg/cm) | 60 | 57 | 58 | 57 | 62 |
| Valcanizate | Tensile strength (Kg/cm) | 278 | 268 | 266 | 260 | 276 |
| Valcanizate | Number of flexings (time) | 8000 | 8000 | 10000 | 8000 | 13000 |
| Valcanizate | Hardness | 84 | 84 | 84 | 84 | 84 |

| | | Example 6 | Example 7 | Example 8 | Example 9 | Example 10 |
|---|---|---|---|---|---|---|
| Formation (Note 5) | | | | | | |
| Reinforced rubber composition | Type | Sample 1 | Sample 1 | Sample 1 | Sample 1 | Sample 1 |
| | Amount (part) | 30 | 15 | 30 | 15 | 15 |
| NR | Amount (part) | 80 | 90 | 50 | 70 | 70 |

TABLE 2-continued

| | | | | | | |
|---|---|---|---|---|---|---|
| BR (Note 1) | Amount (part) | — | — | — | 20 | 20 |
| SBR (Note 2) | Amount (part) | — | — | — | — | — |
| Carbon black (Note 3) | Type | N-330 | N-330 | N-330 | N-330 | N-330 |
| | Amount (part) | 50 | 60 | 50 | 60 | 50 |
| Thermosetting resin | Amount (part) | — | — | — | 5 | — |
| Hexamethylenetetramine | Amount (part) | — | — | — | 0.5 | — |
| Ratio of nylon to total rubber content (PHR) | | 10 | 5 | 10 | 5 | 5 |
| Bead filler rubber composition $ML_{1+4}$ (100° C.) | | 61 | 71 | 63 | 76 | 60 |
| Valcanizate | $M_{50}$ (kg/cm) | 83 | 73 | 69 | 98 | 57 |
| Valcanizate | Tensile strength (Kg/cm) | 266 | 252 | 247 | 195 | 261 |
| Valcanizate | Number of flexings (time) | 2000 | 3000 | 3000 | 1500 | 7000 |
| Valcanizate | Hardness | 86 | 82 | 84 | 92 | 84 |

| | | Example 11 | Example 12 | Example 13 | Comparative Example | Comparative Example |
|---|---|---|---|---|---|---|
| Formation (Note 5) | | | | | | |
| Reinforced rubber composition | Type | Sample 1 | Sample 1 | Sample 1 | | |
| | Amount (part) | 15 | 15 | 15 | — | — |
| NR | Amount (part) | 70 | 70 | 70 | 100 | 100 |
| BR (Note 1) | Amount (part) | 20 | 20 | 20 | — | — |
| SBR (Note 2) | Amount (part) | — | — | — | — | — |
| Carbon black (Note 3) | Type | N-440 | N-550 | N-660 | N-330 | N-330 |
| | Amount (part) | 50 | 50 | 50 | 70 | 80 |
| Thermosetting resin | Amount (part) | — | — | — | — | — |
| Hexamethylenetetramine | Amount (part) | — | — | — | — | — |
| Ratio of nylon to total rubber content (PHR) | | 5 | 5 | 5 | 0 | 0 |
| Bead filler rubber composition $ML_{1+4}$ (100° C.) | | 56 | 58 | 53 | 90 | Non-determinable |
| Valcanizate | $M_{50}$ (kg/cm) | 51 | 54 | 52 | 42 | 51 |
| Valcanizate | Tensile strength (Kg/cm) | 254 | 242 | 221 | 228 | 193 |
| Valcanizate | Number of flexings (time) | 8000 | 7000 | 7000 | <1000 | <1000 |
| Valcanizate | Hardness | 83 | 84 | 82 | 80 | 83 |

(Note 1) BR: polybutadiene (UBEPOL-BR 100, manufactured by Ube Kosan Co., Ltd.)
(Note 2) SBR: styrene-butadiene copolymer rubber (SBR-1500, manufactured by Nippon Gosei Gomu Co., Ltd.)
(Note 3)

| | Particle diameter mμ | DBP oil absorption ml/100 g |
|---|---|---|
| N-330:HAF | 30 | 110 |
| N-440:FF | 38 | 75 |
| N-550:FEF | 41 | 122 |
| N-660:GPF | 84 | 81 |

(Note 4) Other compounding agent zinc oxide: 5 parts, stearic acid: 2 parts, antioxidant N—phenyl-N'—isopropyl-p-phenylenediamine: 1 part, vulcanization acceleration N—oxydiethylenebenzothiazyl-2-sulfenamide: 0.8 part, aromatic oil: 5 parts, sulfur: 3 parts (only Comparative Example 1, 4 parts)

We claim:

1. A bead filler rubber composition, comprising:

(A) a reinforced rubber composition comprising vulcanizable rubber having dispersed therein 5 to 100 parts by weight per 100 parts by weight of the vulcanizable rubber, of fine short fibers of thermoplastic polymer having $$-\overset{\displaystyle O}{\overset{\|}{C}}NH-$$

groups in the polymer molecule, said vulcanizable rubber and said thermoplastic polymer being grafted to each other through a phenol formaldehyde resin precondensate at an interface of the fiber;

(B) a diene rubber; and (C) carbon black, wherein the following conditions (i) through (iv) are satisfied:

(i) the amount of said thermoplastic polymer is 2 to 20 parts by weight per 100 parts by weight of the total amount of the rubber constituents;

(ii) the ratio of the rubber is such that the total amount of natural rubber or polyisoprene in the component (A) and the component (B) is 100 to 55% by weight;

(iii) the amount of the carbon black is 50 to 70 parts by weight per 100 parts by weight of the total amount of the rubber constituents; and (iv) the vulcanizable derived from the rubber composition has a 50% modulus of at least 30 kg/cm2.

2. A bead filler rubber composition as claimed in claim 1, wherein said carbon black has a particle diameter of 90 mμ or less and a dibutyl phthalate oil absorption of 70 ml/100 g or more.

3. A bead filler rubber composition as claimed in claim 1, wherein said composition further comprises 1 to 30 parts by weight, based on 100 parts by weight of the total amount of the rubber constituents, of a thermosetting resin.

4. A bead filler rubber composition as claimed in claim 1, wherein the vulcanizate derived from said bead filler rubber composition has a hardness, determined according to a JIS K 6301 method, of 80 to 150.

* * * * *

UNITED STATES PATENT AND TRADEMARK OFFICE
CERTIFICATE OF CORRECTION

PATENT NO. : 4,532,291

DATED : July 30, 1985

INVENTOR(S) : Junnosuke Hayashi et al.

It is certified that error appears in the above-identified patent and that said Letters Patent is hereby corrected as shown below:

In the ABSTRACT, paragraph (iii), line 2, after "weight" insert --based--.

Signed and Sealed this

*Twenty-second* Day of *April 1986*

[SEAL]

*Attest:*

DONALD J. QUIGG

*Attesting Officer* *Commissioner of Patents and Trademarks*